US012187556B2

(12) United States Patent
Poussin et al.

(10) Patent No.: US 12,187,556 B2
(45) Date of Patent: Jan. 7, 2025

(54) FILLING SYSTEM FOR A CONTAINER FOR SOLID PARTICLES

(71) Applicant: CREALYST-GROUP, Semur-en-Vallon (FR)

(72) Inventors: Bernard Poussin, Semur-en-Vallon (FR); Guillaume Poussin, Saint Germain de la Grange (FR)

(73) Assignee: CREALYST-GROUP, Semur-en-Vallon (FR)

( * ) Notice: Subject to any disclaimer, the term of this patent is extended or adjusted under 35 U.S.C. 154(b) by 783 days.

(21) Appl. No.: 17/256,389

(22) PCT Filed: Jun. 25, 2019

(86) PCT No.: PCT/EP2019/066840
§ 371 (c)(1),
(2) Date: Dec. 28, 2020

(87) PCT Pub. No.: WO2020/007655
PCT Pub. Date: Jan. 9, 2020

(65) Prior Publication Data
US 2021/0155423 A1  May 27, 2021

(30) Foreign Application Priority Data

Jul. 4, 2018  (FR) ..................... 18/56162

(51) Int. Cl.
*B65G 1/14*     (2006.01)
*B65B 1/14*     (2006.01)
*B65G 65/32*    (2006.01)

(52) U.S. Cl.
CPC ................ *B65G 65/32* (2013.01); *B65B 1/14* (2013.01); *B65G 2201/042* (2013.01)

(58) Field of Classification Search
CPC ..... B65G 1/14; B65G 65/32; B65G 2201/042
See application file for complete search history.

(56) References Cited

U.S. PATENT DOCUMENTS

| 3,966,124 A | 6/1976 | Sukup |
| 4,433,707 A | 2/1984 | Farnham |

(Continued)

FOREIGN PATENT DOCUMENTS

| BE | 0 899 420 A | 7/1984 |
| CA | 3017426 A1 | 10/2017 |

(Continued)

OTHER PUBLICATIONS

Indian Examination Report dated Apr. 26, 2022 received in Indian Application No. 202117000815, together with an English-language translation.
Youtube-Video Calydens Technology 100% Catalyst Dense Loading https:www.youtube.com/watch?v=iHyBIT_mdd0 (2016).
Presentation: CALYDENS_2009 Oct Presentation Rev DS.ppt; siehe auch: http://89.161.223.56/pub/DL%20INNOWACJA/ (2009/2015).

(Continued)

*Primary Examiner* — Paul J Gray
(74) *Attorney, Agent, or Firm* — Scully, Scott, Murphy & Presser, P.C.

(57) ABSTRACT

The invention relates to a filling system (1) for a container for storing solid particles, comprising a distribution device (5) for solid particles for receiving and selectively distributing the solid particles towards a dispensing device (7), and comprising at least one divider element (11), the dispensing device (7) comprising at least one scattering element (13) for homogeneously filling the container with solid particles, the divider element (11) being rotatably mounted about an axis substantially parallel to the direction of flow of the stream of solid particles in order to allocate any defect in the flow of the solid particles in the distribution device (5).

7 Claims, 2 Drawing Sheets

(56) References Cited

U.S. PATENT DOCUMENTS

| | | | |
|---|---|---|---|
| 4,972,884 | A | 11/1990 | Souers et al. |
| 5,244,129 | A | 9/1993 | Poussin et al. |
| 7,588,061 | B2 | 9/2009 | Poussin |
| 2008/0039596 | A1 | 2/2008 | Fouarge |
| 2011/0219670 | A1 | 9/2011 | Berger et al. |
| 2013/0298507 | A1 | 11/2013 | Poussin et al. |
| 2020/0290828 | A1* | 9/2020 | Cota ................ B01J 8/002 |

FOREIGN PATENT DOCUMENTS

| | | | |
|---|---|---|---|
| DE | 1 457 867 | A1 | 8/1971 |
| EP | 2648837 | B1 | 2/2015 |
| FR | 2 582 955 | A1 | 12/1986 |
| FR | 2668131 | A1 | 4/1992 |
| FR | 2721900 | B1 | 8/1996 |

OTHER PUBLICATIONS

PKN_-_Polman_presentation_Calydens_2013; siehe auch: http://89.161.223.56/pub/DL%20INNOWACJA/ (2013/2015).

Brochure: The CALYDENS Dense Loading System; siehe auch: https://de.scribd.com/doc/256009581/Calydens-Brochure-a-mettre-a-sur-onglet-produit-pdf (2010).

Screenshot-Serie aus MP4 Video (Wayback Machine) https://www.crealyst.fr/wp-content /uploads/2014/ 07/003-1.-Video-cayldens.mp4 (2016).

Screenshot-Serie aus MP4 Video (Wayback Machine) https://web.archive.org/web/20171028235347/https://www.crealyst.fr/Crealyst Oil-The Calydens-Nouveau logo.mp4 (2017).

Crealyst Homepage 2015 (Wayback Machine), https://web.archive.org/web/20151213065918/http://www.crealyst.fr/the company/ (2015).

International Search Report dated Aug. 27, 2019 issued in PCT/EP2019/066840.

* cited by examiner

FILLING SYSTEM FOR A CONTAINER FOR SOLID PARTICLES

TECHNICAL FIELD OF THE INVENTION

The present invention relates to the field of filling containers with solid particles such as grains or granules. These containers can for example be reactors for the petroleum or chemical industry or silos for the storage of cereals, fertilizers or any other product in the form of solid particles.

TECHNICAL BACKGROUND OF THE INVENTION

Such containers are filled by transferring the solid particles from hoppers or funnels, which discharge the solid particles into the container through flexible sleeves or rigid pipes. Generally, the aim is to fill the container with the maximum of solid product and to have a distribution of the solid particles which is as homogeneous as possible in terms of particle size in order to come as close as possible to the optimum filling determined theoretically.

Thus, in the case of chemical reactors in particular, it is advantageous to have the greatest possible mass of reactant granules in the reactor in order to be able to space out the stops of the equipment linked to the replacement of the reactant granules. It is also important to have a homogeneous particle size distribution throughout the reactor in order to avoid the appearance of preferential paths (zones with lower density of reactant granules) for the substances having to pass through the bed of reactant granules. It is in fact understood that, in such a case, only a part of the reagent granules is used, which would entail replacing all the reactant granules even though a part has not been used. Since these reactant granules have a relatively high cost, it is therefore possible to understand the determining aspect of the homogeneous particle size distribution throughout the reactor.

When loading such a container, it is possible for the filling system to experience a partial obstruction due to stray elements (pieces of plastic resulting from the opening of the packages containing the solid particles, detritus resulting from the cleaning of the hoppers, etc.). Each obstruction disrupts the dispensing of the filling system, which can no longer guarantee homogeneous filling of the container.

SUMMARY OF THE INVENTION

The object of the invention is to remedy these drawbacks by proposing a filling system whose dispensing is less dependent on any stray elements present with the solid particles to be distributed in the container.

To this end, the invention relates to a filling system for a container for storing solid particles, comprising a distribution device for solid particles for receiving and selectively distributing the solid particles towards a dispensing device, and comprising at least one divider element dividing streams of solid particles, the dispensing device comprising at least one scattering element for homogeneously filling the container with solid particles, characterized in that the divider element is rotatably mounted about an axis substantially parallel to the direction of flow of the stream of solid particles in the distribution device in order to allocate any defect in the flow of the solid particles in the distribution device.

Advantageously according to the invention, if a partial blockage of the divider element occurs, the filling system can selectively displace the divider element in a rotational manner in order to distribute the defect induced by the blockage in a circular manner in the container so that it does not stay localized. It is therefore understood that this rotation makes it possible, as the container is filled, to correct the defect in the upper front of solid particles generated by the blockage. The filling system is therefore much less sensitive in the event that stray elements are present with the solid particles to be distributed in the container.

The invention may also comprise one or more of the following optional features, taken alone or in combination.

According to a first embodiment, the divider element can be mounted idle on a fixed ring of the distribution device, which makes it possible to be able to actuate the divider element directly without displacing other members.

According to a second embodiment, the divider element may be secured to a ring mounted idle on a fixed structure of the distribution device, which makes it possible to easily mount external mechanisms in order to actuate the divider element.

Whatever the embodiment and according to a first variant, the divider element can be coupled to a drive mechanism in order to be selectively displaced, which makes it possible to choose when the divider element is displaced and at what speed.

According to a particular version of the first variant, the drive mechanism can be coupled to the dispensing device in order to make the displacement of the divider element proportional to that of the scattering element, which for example makes it possible to use the motor of the dispensing device to displace the divider element.

Whatever the embodiment and according to a second variant, the distribution device comprises at least one drive element which is intended to cooperate with the flow of solid particles in order to displace the divider element, which avoids having to add a drive mechanism.

The scattering element may comprise at least one rotating plate provided with fins of varying lengths so that the periphery of the plate extends substantially in the form of at least one spiral so as to fill the container in the form of a homogeneous rain of solid particles.

BRIEF DESCRIPTION OF THE DRAWINGS

Other features and advantages of the invention will emerge clearly from the description which is given hereinafter, by way of indication and in no way limitingly, with reference to the appended drawings, in which.

DETAILED DESCRIPTION OF AT LEAST ONE EMBODIMENT OF THE INVENTION

In the various figures, identical or similar elements are denoted by the same reference signs, possibly with a subscript character. The description of their structure and function is therefore not always repeated.

In the following, the orientations are the orientations of the figures. In particular, the terms "upper," "lower," "left," "right," "above," "below," "toward the front" and "toward the rear" are generally understood to mean with respect to the direction of illustration of the figures.

The invention generally relates to a filling system for a container such as a catalytic reactor or a storage silo intended to store solid particles such as catalyst in the form of granules or cereal grains. The filling system is intended to be mounted in the upper part of the container in order to dispense the solid particles with a homogeneous and regular rain, making it possible to fill the container progressively along an upper front forming a substantially flat and horizontal surface. This type of filling in fact makes it possible to maximize the quantity of solid particles stored in the container according to a very homogeneous distribution, but also to ensure the protection of the solid particles in particular by preventing their dust-generating attrition.

Figure 1:
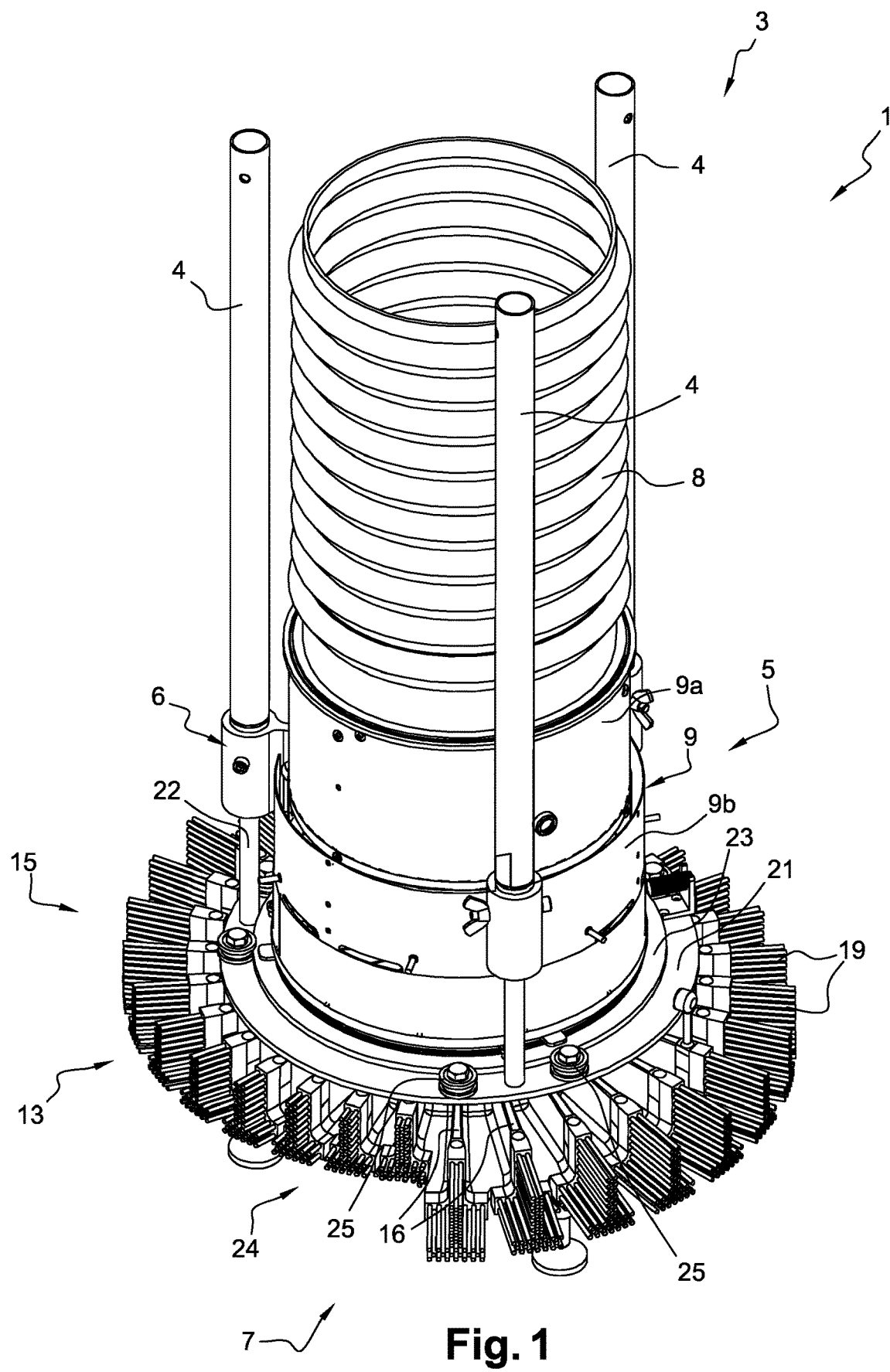
FIG. 1 is a perspective view of a filling system according to a first embodiment of the invention.
Figure 2:
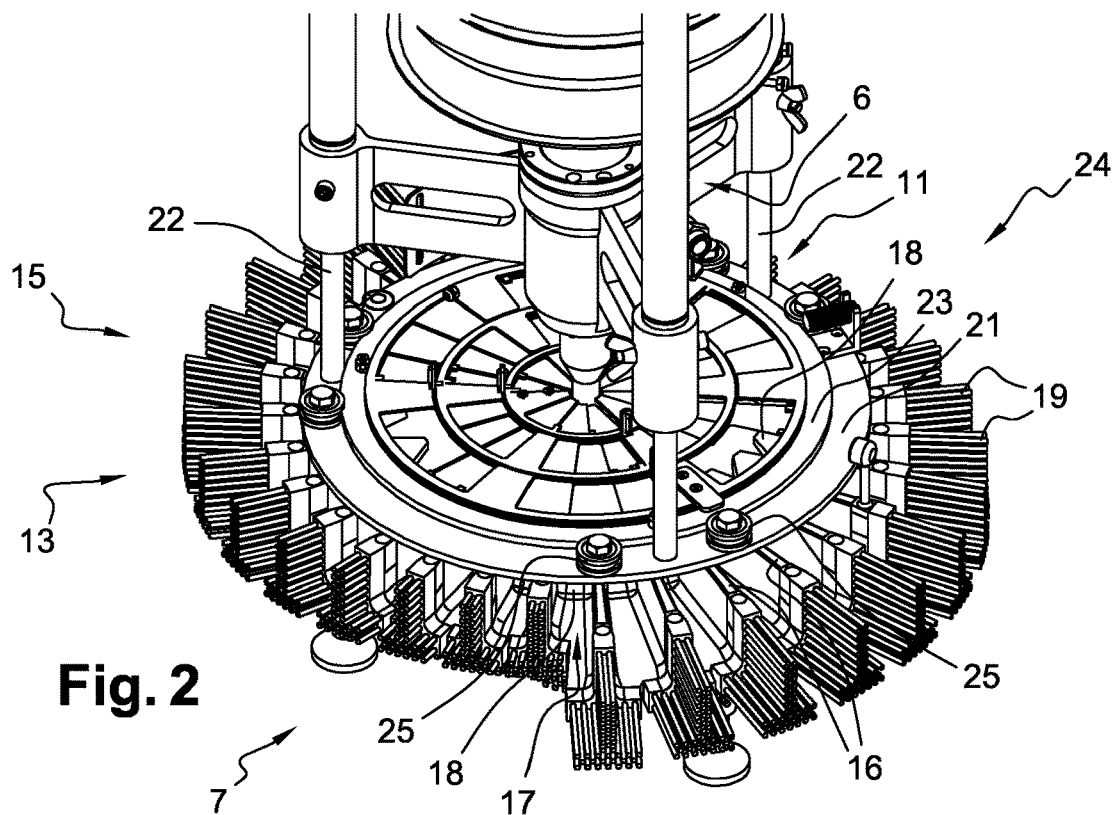
FIG. 2 is a perspective view similar to FIG. 1 in which a casing has been removed in order to visualize a divider element of the filling system according to the first embodiment of the invention.
Figure 3:
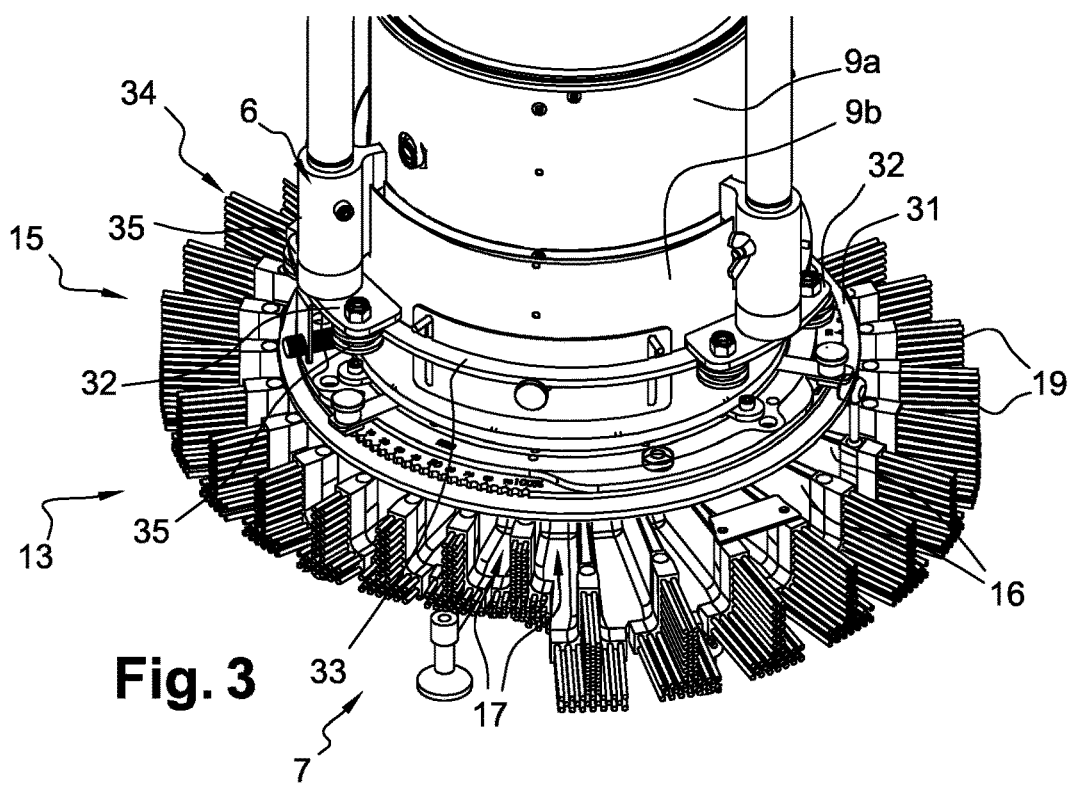
FIG. 3 is a perspective view of a filling system according to a second embodiment of the invention.

In the examples illustrated in FIGS. 1 to 3, the filling system 1 is arranged to fill a chemical reactor with reactant granules. Of course, the invention can also be applied to other fields such as grain silos, or more generally to any container of solid particles such as grains of vegetable plants, for instance coffee beans, or wood pellets.

In the examples illustrated in FIGS. 1 to 3, the filling system 1 is arranged to cooperate with a feed device (not shown) for solid particles. Typically, for chemical reactors, the feed devices are generally conveyors discharging the reactant granules through a filling line fed through the upper opening of the reactor. The filling system 1 according to the invention is therefore placed in communication with this filling line in order to dispense the reactant granules homogeneously in the reactor.

As can be seen in FIG. 1, the filling system 1 comprises a fixing device 3, a distribution device 5 and a device 7 for dispensing the solid particles. The fixing device 3 mainly comprises at least two arms 4 (three in FIG. 1) which are intended to support the filling system 1 in the reactor and each to be fixed to at least part of the reactor.

The distribution device 5 is intended to receive and selectively distribute the solid particles coming from the filling line toward the dispensing device 7. To this end, the distribution device 5 comprises a flexible tube 8 extended by a casing 9. As can be seen in FIG. 1, the flexible tube 8 is intended to receive the filling line, for example by fitting, in order to channel the reactant granules from the filling line to the casing 9 and in particular to at least one divider element 11 for dividing streams of solid particles. The flexible tube 8 is not an essential element of the invention. Thus, it could be removed or replaced by another type of delivery member.

The casing 9 comprises an upper part 9a and a lower part 9b which are essentially tubular and are intended mainly to guide the solid particles toward each divider element 11 located inside at the lower end of the lower part 9b. The upper part 9a further receives a drive mechanism for the dispensing device 7. The latter is secured to the fixing device 3 by a frame 6 connecting its three arms 4 passing through the upper part 9a of the distribution device 5.

The divider element 11 can be of different types. In the examples illustrated in FIGS. 1 to 3, the invention can, for example, use a divider element 11 of the type described in document EP 2,648,837.

More precisely, as visible in the example of FIG. 2, the divider element 11 can thus be a diaphragm mechanism comprising a plurality of shutter flaps, each closing an angular sector of the bottom of the casing 9. More precisely, the diaphragm mechanism comprises means for controlling the displacement of the shutter flaps, configured to be able to partially close off one angular sector independently of the other angular sectors.

According to this example divider element 11, a container is filled with solid particles, regardless of the size of the particles. Each annular sector can also comprise a plurality of shutter flaps, typically at least two, each covering a same angular closing sector. By moving these flaps relative to each other, for the same annular sector, the opening of the angular sector through which the solid particles can pass is modified, so as to at least partially block the sector. It will be understood that the blockage of an angular sector can be total.

By separately controlling the flow rate in each angular sector, it is possible to flexibly modulate the distribution of the solid particles toward the dispensing device 7 and thus to avoid clogging effects of these sectors. It will then be understood that each angular sector selectively offers an axial opening toward the dispensing device 7.

Of course, other types of divider element 11 can be envisaged in addition to or replacing the diaphragm mechanism of the type described in document EP 2,648,837 without departing from the scope of the invention. In no way limitingly, concentric cylinders arranged in the casing 9 could, for example, also divide the stream of solid particles in addition to or as a replacement for the diaphragm mechanism of the type described in document EP 2,648,837. Additionally, the opening of the divider element 11 could, in addition or as a replacement, offer at least one radial opening (that is to say, substantially perpendicular to the axial opening) and/or oblique opening (that is to say, oriented between the axial orientation and the radial orientation) toward the dispensing device 7.

The dispensing device 7 can be of different types. It comprises at least one scattering element 13 intended to fill the container with solid particles in a homogeneous manner and, preferably, in the form of a homogeneous rain of solid particles. The dispensing device 7 may comprise between one and twenty scattering elements 13 and, preferably, between two and five. In no way limitingly, several scattering elements 13 (three in FIGS. 1 to 3, only one of which is mainly visible) may each comprise, as illustrated in FIGS. 1 to 3, a rotating plate 15 provided with fins 16 for ejecting, by centrifugal force, the solid particles in a homogeneous distribution. As visible in FIGS. 1 to 3, the fins 16 preferably have scalable lengths so that the periphery of its associated plate 15 extends substantially in the form of a spiral or of several spirals (two at in FIGS. 1 to 3) so as to eject the solid particles along several rays capable of creating the dispensing in the form of a homogeneous rain.

In addition, each channel 17 formed between two fins 16 preferably comprises a slope 18 directly above one (or more) angular sector(s) of the divider element 11 in order to modify the substantially axial stream of solid particles leaving the divider element 11 in a substantially radial stream toward the ends of the fins 16. The axial orientation in the usage position of the filling system 1 substantially corresponds to that of the action of gravity.

Lastly, preferably, the fins 16 comprise, at their periphery, brushes 19 comprising a series of soft and flexible bristles with varying lengths in a manner similar to the fins 16. The bristles of the brushes 19 can be of various geometries. They are preferably prismatic and/or conical and/or frustoconical, that is to say, each bristle or the bristles between them, and with a circular or polygonal section.

In the examples illustrated in FIGS. 1 to 3, each brush 19 extending from the end of a fin 16 has a projecting surface in the form of an inverted T "⊥". More precisely, a first upper series of bristles is substantially vertical and joins a second lower series of substantially horizontal bristles at the median level of the latter. These bristles have the characteristics of being flexible and smooth in order to protect the solid particles between them. When the solid particles are dispersed, the bristles are arranged to deform elastically as the solid particles pass, then to restore this absorbed energy to direct the final ejection of the solid particles toward the container.

According to a preferred variant, the second lower series of bristles extends, from the end of each fin 16, in an oblique direction with respect to the horizontal axis. More precisely, the second series extends upward relative to the horizontal axis, from the end of each fin 16, so that at least the free ends of the second series of bristles are on the path of the solid particles emerging from its associated channel 17. The slope relative to the horizontal axis of all or part of the second series can thus be between 5 and 10 degrees and, preferably, around 7 degrees. Advantageously, this slope allows the solid particles to be released from the dispensing device 7, at the free ends of the second series of bristles, at a height greater than the outlet of the channels 17 without slowing them down too much so that they are dispensed radially further into the container.

Of course, other dispensing devices 7 can be used, for example of the strap type or of the whip type.

When loading such a container, the filling system 1 may experience a partial obstruction in the casing 9 and at the divider element 11 because of stray elements (pieces of plastic resulting from the opening of the packaging containing the solid particles, waste from cleaning the hoppers, etc.). Each obstruction disrupts the dispensing of the filling system 1, which can no longer guarantee homogeneous filling of the container.

Advantageously according to the invention, the divider element 11 is mounted so as to rotate about an axis which is substantially parallel to the direction of flow of the stream of solid particles in order to distribute any defect in the flow of solid particles in the dispensing device 7. Thus, for example, if a partial blockage of the divider element 11 occurs, the filling system 1 can selectively displace the divider element 11 in a rotational manner in order to distribute the defect induced by the blockage in a circular manner in the container so that it does not stay localized. It is therefore understood that this rotation makes it possible, as the container is filled, to correct the defect generated by the blockage on the upper front of solid particles in the container. The filling system 1 is therefore much less sensitive in the event that stray elements are mixed with the solid particles to be distributed in the container.

According to a first embodiment illustrated in FIGS. 1 and 2, the divider element 11 is mounted idle on a fixed ring 21, that is to say freely rotating relative to the fixed ring 21, of the distribution device 5. This embodiment thus makes it possible to be able to actuate the divider element 11 directly without displacing other members. In the example illustrated in FIG. 2, it can be seen that the fixed ring 21 is mounted on a distribution device 5 by three bars 22 attached to the frame 6. The fixed ring 21 cooperates with the divider element 11 by means of a relative displacement assembly 24. The latter, in the example illustrated in FIGS. 1 and 2, mainly comprises an annular cam 23 secured to the divider element 11 and several rollers 25 pivotally mounted on the fixed ring 21. The peripheral surface of the annular cam 23 is therefore capable of rolling against the grooves formed in the peripheral surface of each roller 25 in order to drive the set of divider element(s) 11 in rotation.

In the example illustrated in FIGS. 1 and 2, the relative displacement assembly 24 comprises a roller 25 on either side of each bar 22, that is to say comprises six rollers 25 in total. Of course, the relative displacement assembly 24 could include other types of rollers 25 and/or a different number of rollers 25. Likewise, the relative displacement assembly 24 could be reversed, that is to say, the fixed ring 21 could carry the annular cam 23, and the divider element 11, the rollers 25, without departing from the scope of the invention. Finally, the relative displacement assembly 24 cannot be limited to cam 23-rollers 25 pairs. Thus, in no way limitingly, the relative displacement assembly 24 could be of the rolling type, such as a ball for example, without departing from the scope of the invention.

According to a second embodiment illustrated in FIG. 3, the divider element 11 is secured to a ring 31 mounted idle on a fixed structure of the distribution device 5. This embodiment thus makes it possible to easily mount external mechanisms in order to actuate the divider element 11.

In the example illustrated in FIG. 3, it can be seen that the ring 31 is mounted below and protruding from the periphery of the divider element 11 so that the latter 11 is secured in movement with the former 31. Furthermore, in the example illustrated in FIG. 3, the divider element 11 is secured with the lower part 9b of the casing 9. In addition, the lower part 9b cooperates with the rest of the (fixed) parts of the distribution device 5 by means of a relative displacement assembly 34. The latter 34, in the example illustrated in FIG. 3, mainly comprises an annular cam 33 secured to the peripheral part of the lower part 9b and several rollers 35 mounted to pivot on journals 32 fixed to the frame 6.

The peripheral surface of the annular cam 33 is therefore capable of rolling against the grooves formed in the peripheral surface of each roller 35 in order to drive the assembly comprising said at least divider element 11, the idle ring 31 and the lower part 9b of the casing 9 in rotation relative to the rest of the parts of the distribution device 5.

In the example illustrated in FIG. 3, the relative displacement assembly 34 comprises two rollers 35 on each journal 32, that is to say comprises six rollers 35 in total. Of course, the relative displacement assembly 34 could comprise other types of rollers 35 and/or a different number of rollers 35. Likewise, the relative displacement assembly 34 could be reversed, that is to say, the journals 32 could carry the annular cam 33, and the lower part 9b, the rollers 35, without departing from the scope of the invention. Finally, the relative displacement assembly 34 cannot be limited to cam 33-rollers 35 pairs. Thus, in no way limitingly, the relative displacement assembly 34 could be of the rolling type, such as a ball for example, without departing from the scope of the invention.

Whatever the embodiment and according to a first variant, the divider element 11 can be coupled to a drive mechanism in order to be selectively displaced. This makes it possible in particular to be able to control the displacement (start, speed, stop, etc.) according to the operating conditions of the filling system 1. In no way limitingly, it is for example possible to use a drive mechanism of the electric type (not shown). The drive mechanism can thus mainly comprise a toothed wheel secured to the fixed ring 21 or the idle ring 31, a reduction gear train and a motor assembly. Consequently, it is understood that the rotation of the divider element 11 can be actuated without the mandatory presence of an operator. By way of example, the activation of the rotation of the divider element 11 could be slaved to the activation of the feed device (not shown) or the presence of solid particles in the casing 9.

According to a particular version of the first variant, the drive mechanism is coupled to the dispensing device 7 in order to make the displacement of the divider element proportional to that of the scattering element, which for example makes it possible to use the motor of the dispensing device 7 to move the divider element 11. Thus, in no way limitingly, the reduction gear train explained above could be coupled to the motor of the dispensing device 7 or to a transmission shaft of the motor such as, for example, that of the scattering element 13. Typically, the divider element 11 could rotate between two and four hundred times more slowly than the plate 15, and, preferably, between ten and two hundred times more slowly. However, conversely, nothing prevents the divider element 11 from rotating at the same speed as or faster than the scattering element 13.

Whatever the embodiment and according to a second variant, the distribution device 5 comprises at least one drive element (not shown) which is intended to cooperate with the flow of solid particles in order to displace the divider element 11. This makes it possible in particular to be able to absorb part of the energy of the displacement of the solid particles so as not to have to add a drive mechanism to the filling system 1 like in the first variant. By way of example, the drive element could be formed by a curved or rectilinear rib mounted upstream from the divider element 11 or on the internal wall of the lower part 9b so that the stop of part of the axial displacement of the solid particles against these ribs induces a rotation of the divider element 11. It is therefore understood that the rotation of the divider element 11 would be dependent on the flow rate of solid particles arriving in the casing 9.

The invention is not limited to the embodiments and variants described here, and other embodiments and variants will become clearly apparent to a person skilled in the art. The invention cannot be limited to the applications described above, but can be applied to any type of filling of a container with solid particles.

Further, although automatable movements of the divider element 11 are proposed, the invention relates mainly to the rotary mounting of the divider element 11 which can, of course, also be moved manually by an operator directly (direct gripping) or indirectly (use of a tool or command).

It can also be envisaged that the filling system 1 comprises several divider elements 11 of identical shape or not, mounted for example coaxially in order to optimize the distribution of the solid particles.

Additionally, it can also be envisaged that the filling system 1 comprises several dispensing devices 7 of identical geometry or not, mounted for example coaxially in order to optimize the dispensing of the solid particles.

The invention claimed is:

1. A filling system for a container for storing solid particles, comprising:
   a distribution device for solid particles for receiving and selectively distributing the solid particles towards a dispensing device, and comprising a set of divider elements dividing streams of solid particles,
   the dispensing device comprising at least one scattering element for homogeneously filling the container with solid particles,
   wherein the set of divider elements is 360° rotatably mounted about an axis parallel to the direction of flow of the stream of solid particles in the distribution device in order to circularly allocate any defect in the flow of the solid particles in the distribution device.

2. The filling system according to claim 1, wherein the divider element is mounted idle on a fixed ring of the distribution device.

3. The filling system according to claim 1, wherein the divider element is secured to a ring mounted idle on a fixed structure of the distribution device.

4. The filling system according to claim 1, wherein the divider element is coupled to a drive mechanism so as to be selectively displaced.

5. The filling system according to claim 4, wherein the drive mechanism is coupled to the dispensing device in order to make the displacement of the divider element proportional to that of the scattering element.

6. The filling system according to claim 1, wherein the distribution device comprises at least one drive element which is intended to cooperate with the flow of solid particles in order to displace the divider element.

7. The filling system according to claim 1, wherein the scattering element comprises at least one rotating plate provided with fins of varying lengths so that the periphery of the plate extends in the form of at least one spiral so as to fill the container in the form of a homogeneous rain of solid particles.

* * * * *